(12) United States Patent
Albrecht

(10) Patent No.: US 11,415,667 B2
(45) Date of Patent: Aug. 16, 2022

(54) SIGNALING DEVICE FOR PASSIVELY TRANSMITTING SIGNALS

(71) Applicant: The Boeing Company, Chicago, IL (US)

(72) Inventor: Mark Albrecht, Lake Stevens, WA (US)

(73) Assignee: THE BOEING COMPANY, Chicago, IL (US)

( * ) Notice: Subject to any disclaimer, the term of this patent is extended or adjusted under 35 U.S.C. 154(b) by 740 days.

(21) Appl. No.: 16/269,050

(22) Filed: Feb. 6, 2019

(65) Prior Publication Data
US 2020/0249313 A1    Aug. 6, 2020

(51) Int. Cl.
| | |
|---|---|
| G01S 7/40 | (2006.01) |
| H04B 1/3822 | (2015.01) |
| H04B 1/40 | (2015.01) |
| G01S 13/75 | (2006.01) |

(52) U.S. Cl.
CPC ............ *G01S 7/4008* (2013.01); *G01S 13/75* (2013.01); *H04B 1/3822* (2013.01); *H04B 1/40* (2013.01); *G01S 7/4013* (2021.05)

(58) Field of Classification Search
CPC ...... G01S 7/4008; G01S 13/75; G01S 7/4013; H04B 1/3822; H04B 1/40
See application file for complete search history.

(56) References Cited

U.S. PATENT DOCUMENTS

| | | | | |
|---|---|---|---|---|
| 4,019,179 A | * | 4/1977 | Sivertson, Jr. | G01S 13/75 342/5 |
| 4,068,232 A | * | 1/1978 | Meyers | B07C 3/12 342/193 |
| 5,532,679 A | * | 7/1996 | Baxter, Jr. | G01N 33/1833 340/693.9 |
| 6,320,509 B1 | * | 11/2001 | Brady | B65D 25/205 340/572.7 |
| 6,556,174 B1 | * | 4/2003 | Hamman | H01Q 19/10 343/912 |
| 6,999,041 B2 | * | 2/2006 | Holly | H01Q 3/46 343/793 |

(Continued)

FOREIGN PATENT DOCUMENTS

| | | | | |
|---|---|---|---|---|
| GB | 2326786 A | * | 12/1998 | ............. H04B 10/11 |
| WO | WO-9209906 A1 | * | 6/1992 | ........... G01S 13/753 |
| WO | WO-2020130913 A1 | * | 6/2020 | ........... A43B 3/0005 |

OTHER PUBLICATIONS

Cuming Microwave, "Radar Reflectors and Lenses", Retrieved from the internet: URL: https://www.cumingmicrowave.com/products/radar-reflectors-and-lenses.html [retrieved on Dec. 11, 2018], pp. 1-2.

(Continued)

*Primary Examiner* — Vladimir Magloire
*Assistant Examiner* — Nazra Nur Waheed
(74) *Attorney, Agent, or Firm* — Coats & Bennett, PLLC (57) ABSTRACT

A signaling device that provides for passive radar detection. An incoming radar signal is reflected back outward away from the device with increased power. The incoming radar signal can also power a harmonic transceiver and generate a harmonic signal that is transmitted outward away from the device. The signaling device can also include one or more powered components to further transmit an outgoing signal.

20 Claims, 11 Drawing Sheets

(56) References Cited

U.S. PATENT DOCUMENTS

2015/0248569 A1* 9/2015 Rushing ............. G06K 19/0717
340/10.34
2019/0165483 A1* 5/2019 Shiozaki ................ H01Q 19/10

OTHER PUBLICATIONS

Rasilainen, K., et al., "Transponder Designs for Harmonic Radar Applications", International Journal of Antennas and Propagation, May 15, 2015, pp. 1-8, vol. 2015, Article ID 565734.
RECCO, "The RECCO® system", Retrieved from the internet: URL: http://www.recco.com/the-recco-system [retrieved on Dec. 11, 2018], pp. 1-2.
Milanesio, D., et al., "Design of an harmonic radar for the tracking of the Asian yellow-legged hornet", Ecology and Evolution, Mar. 2, 2016, pp. 1-21.

* cited by examiner

SIGNALING DEVICE FOR PASSIVELY TRANSMITTING SIGNALS

TECHNOLOGICAL FIELD

The present disclosure generally relates to signaling devices and more particularly to passive signaling devices that receive an incoming microwave signal and transmits an outgoing signal.

BACKGROUND

Signaling devices are used in a variety of contexts. One context is a device often referred to as a "black box" that is used with an aircraft to record information for retrieval in the event of a situation. Another context is for use by boaters, hikers, or skiers. In the event they are stranded such as during an avalanche, stranded because their boat capsizes, or otherwise become lost, the signaling device can be used to transmit a signal that can be received by searchers.

Current signaling devices can rely on an internal battery to energize components that transmit an outgoing signal. However, the reliance on battery power limits the amount of time the signal can be transmitted. Once the battery is spent, the device is not able to transmit a signal thus making locating the device more difficult for a rescuer.

SUMMARY

One aspect is directed to a signaling device. The signaling device includes a casing with an interior space. A reflector is positioned in the interior space to reflect an incoming microwave signal. A harmonic transceiver is positioned within the interior space of the casing. A lens is connected to the casing to focus the incoming microwave signal on at least one of the reflector and the harmonic transceiver. The reflector reflects the microwave signal back through the lens and away from the casing as a reflected signal. The harmonic transceiver generates a harmonic signal in response to being exposed to the microwave signal and transmits the harmonic signal away from the casing.

In another aspect, the harmonic transceiver comprises a first antenna to receive the microwave signal, a non-linear device, and a second antenna to transmit the harmonic signal.

In another aspect, a resonant cavity is configured to produce the reflected signal to have the same harmonic frequency as the harmonic signal.

In another aspect, the harmonic transceiver is positioned in the interior space between the lens and the reflector.

In another aspect, the harmonic transceiver comprises a non-linear device and at least one antenna.

In another aspect, the reflector reflects the microwave signal to the harmonic transceiver.

In another aspect, the casing and the lens extend around and form a weatherproof seal around the interior space.

In another aspect, the casing includes a center of gravity within the interior space that is away from the lens for the lens to be positioned upward when the passive radar device floats in water.

In another aspect, the device further comprises a control system comprising a control circuit, a read only memory circuit that stores a unique identifier, a communication circuit to transmit an outgoing signal, and a power source to supply power to the control circuit.

One aspect is directed to a vehicle comprising the signaling device.

In another aspect, the vehicle is an aircraft.

One aspect is directed to a signaling device. The signaling device includes a casing that extends around an interior space. A lens is attached to the casing to focus an incoming microwave signal in the interior space. A harmonic transceiver in the interior space generates and outputs a harmonic signal in response to exposure to the microwave signal. A reflector positioned in the interior space reflects the microwave signal back through the lens and away from the casing as a reflected signal. A powered control system is positioned in the interior space and configured to emit a signal outward beyond the casing.

In another aspect, the harmonic transceiver comprises a first antenna to receive the microwave signal, a non-linear device, a second antenna to transmit the harmonic signal, and an inductor that extends between the first antenna and the second antenna.

In another aspect, the harmonic signal and the reflected signal have a common harmonic frequency.

In another aspect, the lens is positioned at a top of the casing, the reflector is positioned at a bottom of the casing, and the harmonic transceiver is positioned between the lens and the reflector.

One aspect is directed to a method of using a passive device. The method includes receiving an incoming microwave signal at a lens. The method includes passing the incoming microwave signal through the lens in a first direction and to a harmonic transceiver and to a reflector positioned within an enclosed interior space. The method includes reflecting the microwave signal off the reflector and sending a reflected signal back through the lens in an opposing second direction and away from the interior space. The method includes creating an electrical current in the harmonic transceiver in response to the harmonic transceiver receiving the microwave signal that passes through the lens. The method includes generating a harmonic signal at the harmonic transceiver and transmitting the harmonic signal away from the interior space.

In another aspect, the method comprises directing the reflected signal back through the lens and increasing a strength of the reflected signal.

In another aspect, the method comprises transmitting the harmonic signal through an antenna that is positioned away from the interior space.

In another aspect, the method comprises the harmonic signal and the reflected signal having the same harmonic frequency.

In another aspect, the method comprises reflecting the microwave signal off the reflector and to the harmonic transceiver.

DETAILED DESCRIPTION

The present application is directed to a passive signaling device. An incoming microwave signal is reflected back outward away from the device with increased power for the field of view. An incoming microwave signal can also power a harmonic transceiver and generate a harmonic signal that is transmitted outward away from the device. The signaling device can also include one or more powered components to further transmit an outgoing signal.

Figure 1:
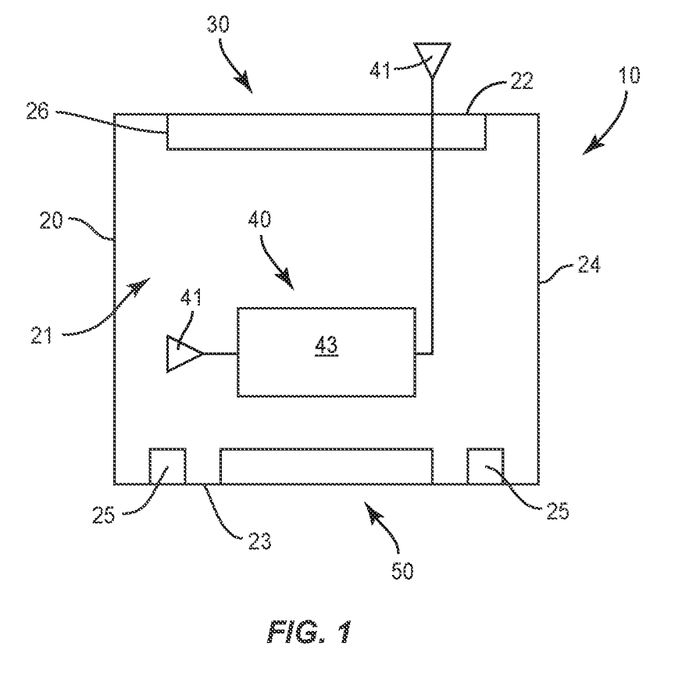
FIG. 1 is a schematic view of a passive signaling device.

FIG. 1 illustrates a signaling device 10 that includes a casing 20 that extends around an interior space 21. A harmonic transceiver 40 and a reflector 50 are positioned within the interior space 21. One or more antennas 41 are connected to the harmonic transceiver 40 to receive the signal and transmit them to a non-linear device 43. A lens 30 is connected to the casing 20 and is exposed to receive the incoming microwave signal. The lens 30 directs the microwave signal to the reflector 50 and/or the harmonic transceiver 40.

An incoming microwave signal, such as a signal transmitted from a remote radar device, passes through the lens 30 and into the interior space 21. The incoming microwave signal is directed to and returned by the reflector 50 back through the interior space 21 and out through the lens 30. The harmonic transceiver 40 can include one or more antennas 41 that receive the microwave signal. One or more of the antennas 41 can be positioned within the interior space 21 to receive the microwave signal from the lens 30 and/or the reflector 50. One or more of the antennas 41 can also be positioned outside of the casing 20 to receive the incoming microwave signal directly from the remote source. In response to receiving the microwave signal, the non-linear device 43 produces a harmonic signal that is transmitted through one or more of the antennas 41 and away from the casing 20.

The ability of the signaling device 10 to return both a first signal through the reflector 50 and a second signal through the harmonic transceiver 40 can facilitate a search and rescue effort. Situations can occur in which one signal may be more effective for receipt by a remote source (e.g., rescue personnel). In one situation, the reflected signal can be more effective when searching for a person floating in the ocean. In another situation with rescue personnel searching for a person floating in the ocean surrounded by surface oil and/or with various amounts of debris in the water. The amount of signal noise from the debris could drown out the reflected microwave signal. In this situation, the outgoing signal from the harmonic transceiver 40 can be more effective in finding the person. In one design, the strength of the reflected signal is much greater than the signal transmitted from the harmonic transceiver 40.

The casing 20 forms the enclosed interior space 21 and protects the interior components including the reflector 50 and the harmonic transceiver 40. The casing 20 includes a first side 22 and an opposing second side 23. Lateral sides 24 extend between the first side 22 and the second side 23. The casing 20 can include a unitary construction, or can be constructed from multiple different sections that are connected together. The casing 20 can be weatherproof to prevent the ingress of water or other debris into the interior space 21, such as when the device 10 is floating in water. The casing 20 can be tamper resistant to prevent intentional damage or destruction of the device 10 to prevent its functionality.

The casing 20 can be further configured to be buoyant in water. The buoyancy can be caused by the air that is contained within the interior space 21. The casing 20 can also be constructed from or include a material that floats in water. The casing 20 can also be constructed to maintain a specific orientation when placed in water. This can include the first side 22 facing upward such that the lens 30 and/or one or more of the antennas 41 are exposed for incoming and outgoing signaling. In one design, one or more weights 25 can be attached to the casing 20 such as within in the interior space 21 or connected to an exterior. The one or more weights 25 cause the first side 22 to face upward when the casing 20 is floating. In another design, one or more internal components (e.g., reflector 50, harmonic transceiver 40) provide the necessary weight to orient the casing 20 in the desired orientation when the casing 20 is floating. The casing 20 can include a center of gravity within the interior space 21 that is away from the lens 30. This provides for the lens 30 to be positioned upward when the device 10 floats in water.

Sections of or the entirety of the casing 20 can be configured to increase visibility. This can include but is not limited to having a brightly-colored outer surface and/or a reflective outer surface. The casing 20 can include a code that identifies the device 10 when it is found by rescuers to identify the associated vehicle or person.

The lens 30 is connected to the casing 20. In one design as illustrated in FIG. 1, the lens 30 is connected to the casing 20 at the first side 22. Other designs include the lens 30 positioned at other and/or additional locations along the casing 20, such as along one or more of the lateral sides 24. The lens 30 can be positioned in an opening 26 in the casing 20. The lens 30 can be secured in the opening 26 by various manners including adhesives and mechanical fasteners. The connection maintains the waterproof ability of the casing 20 and the protected interior space 21.

The lens 30 functions to direct the incoming microwave signal into the interior space 21 and to the reflector 50 and/or the receiving antenna 41 of the harmonic transceiver 40. The lens 30 can also boost the strength of the incoming signal that enters into the interior space 21 and is directed to either the reflector 50 or the harmonic transceiver 40. The lens 30 can also focus the outgoing signal to boost the strength.

The lens 30 can include a variety of configurations and constructions. In one design, the lens 30 is a dielectric, microwave lens. The lens 30 can be configured as a wide angle lens to enable better detection of the outgoing signal by boat or ground. The lens 30 can also be configured as a narrow angle lens for better detection of the outgoing signal by air or space.

The lens 30 can include a single lens 30, or can include two or more lenses 30. In multiple lens designs, the multiple lenses 30 can also be positioned at different locations along the casing 20, such as space-apart locations along one or more of the first side 22 and lateral sides 24.

The reflector 50 is positioned within the interior space 21 of the casing 20. The reflector 50 receives the incoming signal that passes through the lens 30. The reflector 50 directs the signal to one or both of the lens 30 and the harmonic transceiver 40. In one design as illustrated in FIG. 1, the reflector 50 is attached to the second side 23. Other designs include the reflector 50 positioned away from the second side 23. The reflector 50 can be connected to the casing 20 in various manners, including but not limited to adhesives and mechanical fasteners.

The reflector 50 can be a retroreflector. The reflector 50 reflects the signal back towards the lens 30 and/or harmonic transceiver 40 with a minimum of scattering. The reflected signal can be reflected back along a vector that is parallel and opposite to that of the incoming signal within the interior space 21. Other designs can include the reflector 50 being a parabolic reflector, a retroflector, or a flat reflector. In another design, the reflector 50 is spherical. In one design, the reflector 50 is configured to reflect the signal back at a given field of view.

The harmonic transceiver 40 is positioned within the interior space 21. One or more antennas 41 are connected to the non-linear device 43 for receiving and/or transmitting signals. One or more of the antennas 41 can be positioned within the interior space 21 and receive the signal from one or both of the lens 30 and the reflector 50. One or more antennas 41 can be positioned outside of the casing 20 away from the interior space 21. These antennas 41 can receive the incoming signal and/or transmit the outgoing signal produced by the non-linear device 43.

Figure 2:
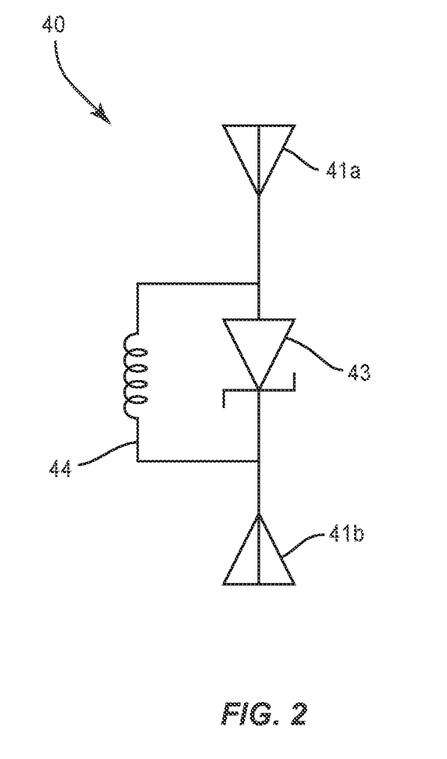
FIG. 2 is a schematic view of a harmonic transceiver.

FIG. 2 illustrates a harmonic transceiver 40 that includes a receiving antenna 41a, a transmitting antenna 41b, and a non-linear device 43. The receiving antenna 41a is tuned to a frequency to receive the incoming microwave signal. The non-linear device 43, such as a diode, receives the signal from the receiving antenna 41a. The non-linear device 43 multiplies the frequency. The transmitting antenna 41b is tuned to the multiplied frequency created by the non-linear device 43 and emits the outgoing signal as a result of the excitation. The frequency that is emitted through the harmonic transceiver 40 is based on the frequency of the received wavelength. By way of example, the outgoing signal can be twice that of the incoming signal.

An electrical connection 44 extends between the receiving antenna 41a and the transmitting antenna 41b. In one design, the electrical connection 44 is an inductor. The electrical connection 44 maintains an equal voltage potential for each antenna 41a, 41b. The electrical connection 44 can prevent an electrostatic charge from building up to an amount that the non-linear device 43 becomes non-conducting.

The harmonic transceiver 40 can also include a single antenna 41. The antenna 41 is configured to accommodate the incoming wavelength and the outgoing harmonic frequency.

In use, the microwave signal is received by the receiving antenna 41a. The receiving antenna 41a transmits the signal to the non-linear device 43 which can be a frequency multiplier. The transmitting antenna 41b is tuned to the multiplied frequency and transmits the signal outward away from the device 10. The non-linear device 43 can include various devices, including but not limited to a Schottky diode and non-linear diodes.

Harmonic transceivers 40 can be employed that receive and transmit at various microwave and harmonic frequencies. Further, the configuration of the casing 20, lens 30, and/or reflector 50 can be configured to produce a variety of harmonic frequencies.

In one design, the harmonic transceiver 40 includes a single antenna 41 that functions to both receive the incoming signal and transmit the outgoing signal.

In another design, the casing 20, lens 30, and/or reflector 50 are configured as a resonant cavity for the reflected signal to have the same harmonic frequency as that produced by the harmonic transceiver 40. The resonant cavity can be configured to amplify the signal to coincide with that from the harmonic transceiver 40. In one design, the reflector 50 of the resonant cavity is a retro reflector, a parabolic reflector, or a spherical reflector.

Figure 3:
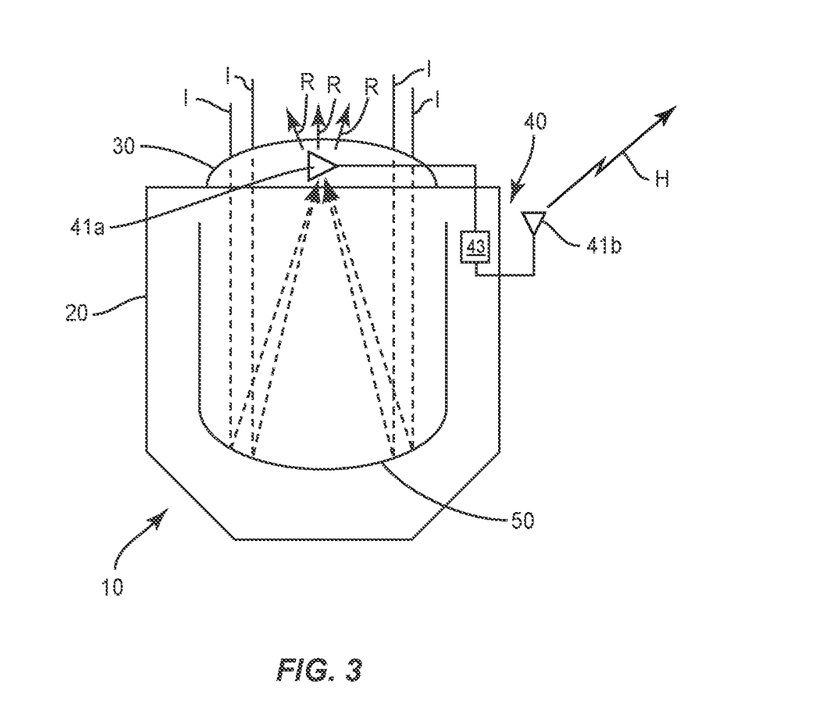
FIG. 3 is a schematic diagram of a passive signaling device.

FIG. 3 illustrates the interaction of the signaling device 10 with an incoming microwave signal I. In this design, the lens 30 is a dielectric microwave lens. The incoming signal I is directed through the lens 30 to the reflector 50. The reflector 50 directs the reflected signal R outward away from the device 10 at a given angle. The receiving antenna 41a is positioned at or near the focal point and receives the signal from the reflector 50. The signal is transmitted to the non-linear device 43 which multiples the signal and the harmonic frequency is output through the transmitting antenna 41b.

Figure 4:
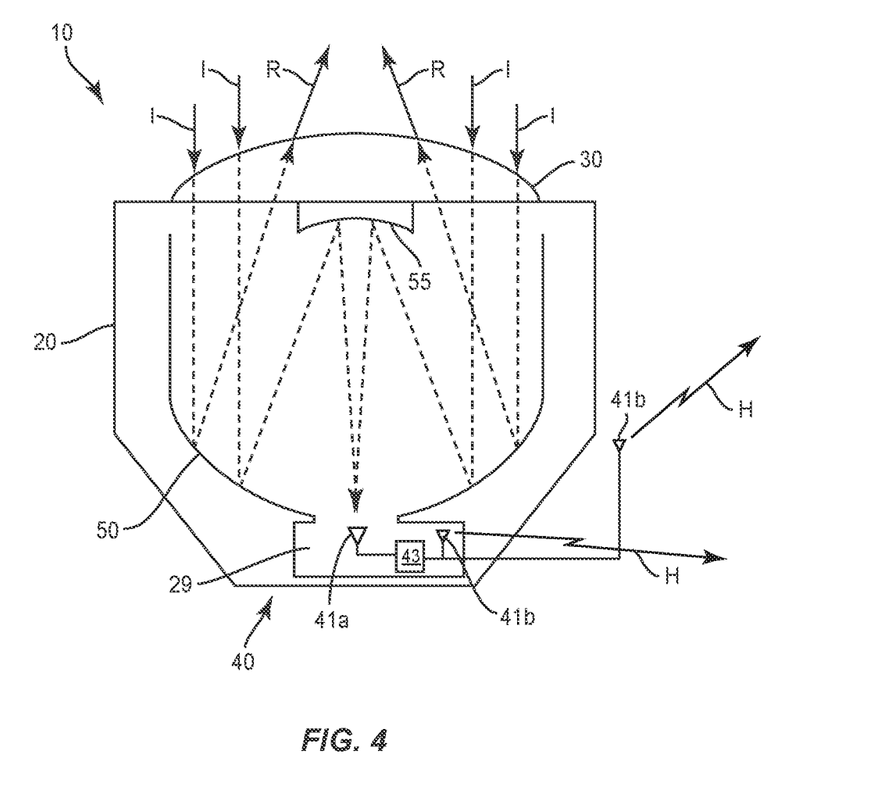
FIG. 4 is a schematic diagram of a passive signaling device.

FIG. 4 includes a signaling device 10 that includes a reflector 50 and a secondary reflector 55. A resonate cavity 29 is positioned below the reflector 50 and includes one or more elements of the harmonic transceiver 40. The incoming signal I passes through the lens 30 to the reflector 50. The signal is reflected upward and is directed back through the lens 30 and outward away from the device 10 as an outgoing reflected signal R at a field of view. The reflected signal is also reflected off of the secondary reflector 55 and directed into the resonate cavity 29 to the incoming antenna 41a. The signal is transmitted to the non-linear device 43 and the harmonic frequency is output through the transmitting antenna 41b.

Figure 5:
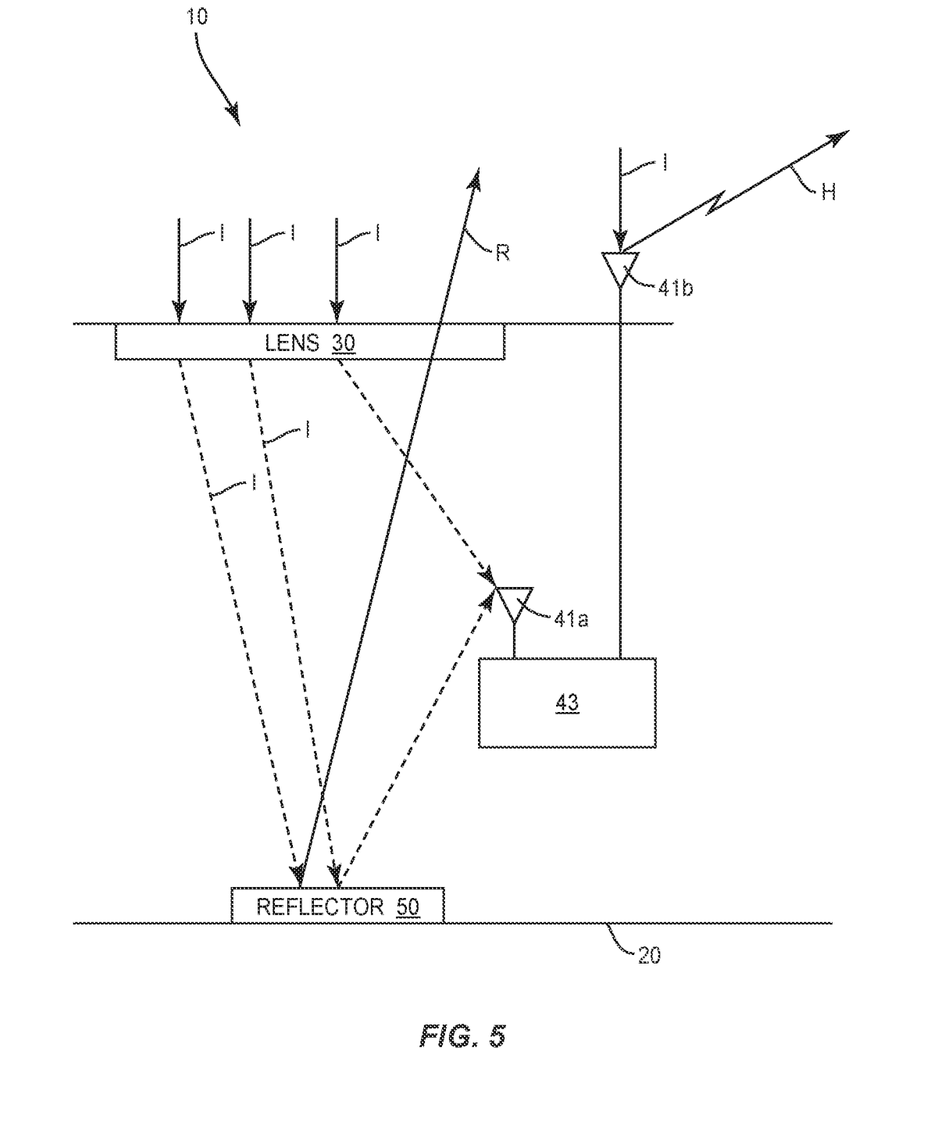
FIG. 5 is a schematic diagram of a passive signaling device.

FIG. 5 discloses another interaction of the signaling device 10 with the incoming microwave signal I. Incoming microwave signal I passes through the lens 30 and is directed to the reflector 50. The reflected signal passes back through the lens 30 and outward away from the casing 20 as a reflected signal R. The reflected signal R can be stronger than the incoming signal I due to being focused on the reflector 50.

The incoming microwave signal I can also be directed to the receiving antenna 41a of the harmonic transceiver 40. The received signal is transmitted to the non-linear device 43 and the harmonic frequency is output through the transmitting antenna 41b. The harmonic transceiver 40 can also include one or more antennas 41 positioned on the exterior of the casing 20 that receive the incoming microwave signal I. The signal is transmitted to the non-linear device 43 and output by the transmitting antenna 41b.

Figure 6:
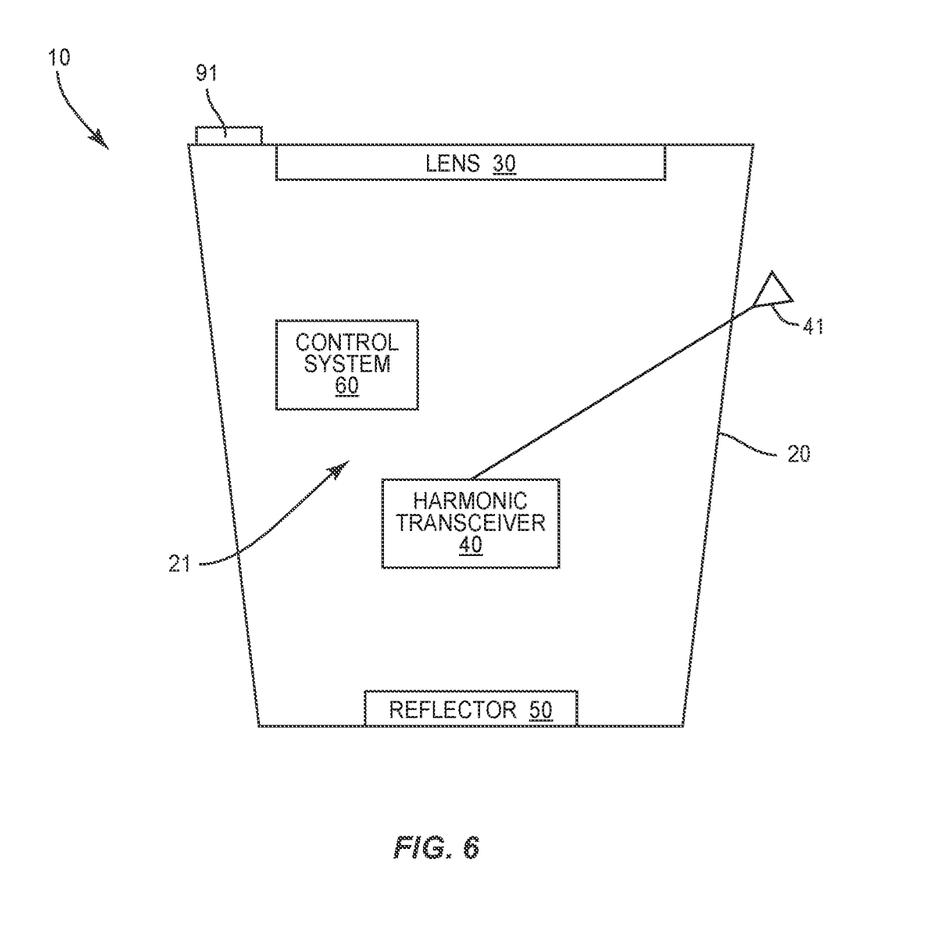
FIG. 6 is a schematic view of a passive signaling device.

The signaling device 10 can also include powered signaling capability to transmit an outgoing signal. FIG. 6 illustrates a signaling device 10 that includes a powered control system 60 configured to transmit an outgoing signal. The control system 60 is positioned within the interior space 21 where it is protected by the casing 20.

Figure 7:
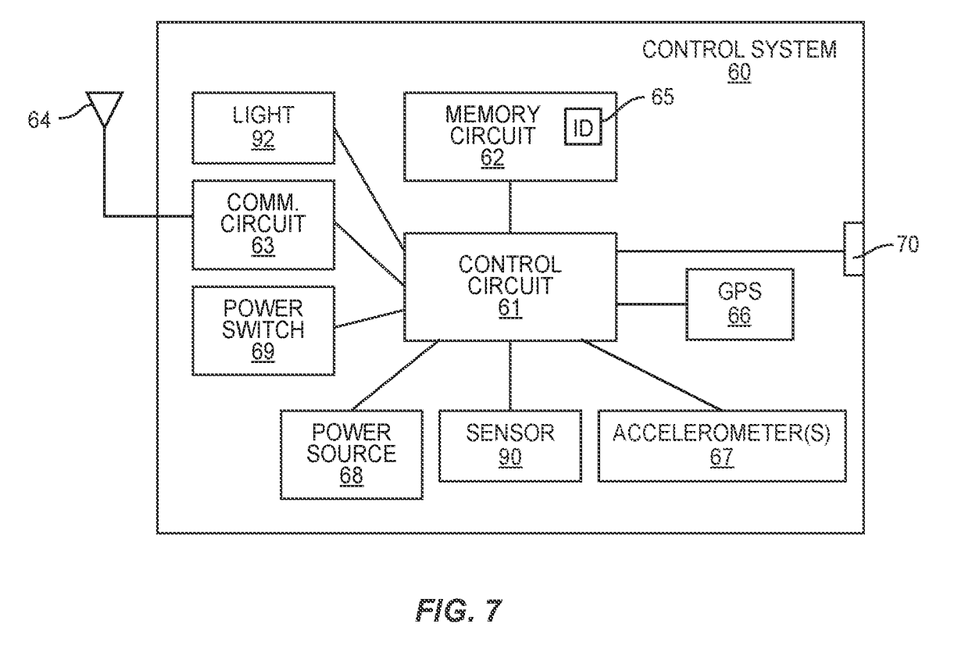
FIG. 7 is a schematic diagram of a control system for use with a passive signaling device.

As illustrated in FIG. 7, the control system 60 includes a control circuit 61 operative to control the overall functionality of the device 10. The control circuit 61 can include one or more microprocessors, microcontrollers, Application Specific Integrated Circuits (ASICs), or other programmable devices. The control circuit 61 can be configured to execute program code stored within a memory circuit 62 of the device 10. The memory circuit 62 can include one or several types of non-transitory memory, including, for example, read-only memory, flash memory, magnetic or optical storage devices, or the like. A unique identifier 65 can be stored in the memory circuit 62 and transmitted to identify the device 10 and an associated vehicle and/or person.

A communications circuit 63 provides for transmitting an outgoing signal. The communications circuit 63 can include a radio frequency transmitter for transmitting the signal through an antenna 64. The antenna 64 can be positioned within the interior space 21, or can extend outward to an exterior of the casing 20. In one design, the communications circuit 63 further includes a receiver for receiving a signal through the antenna 64. In one design, upon activation the communications circuit 63 begins to transmit a signal, such as a 406 MHz signal. The communication circuit 63 can also include RFID signaling to communicate information such as but not limited to the identification information of the device 10 and the current location. An input/output (I/O) port 70 can provide a wired connection with another electronic device. In one design, the port 70 is a USB port to retrieve data.

A power source 68 can provide power to the control system 60 for transmitting the outgoing signal. The power source 68 can include one or more batteries or other type of storage device capable of storing energy for use in activating the control system 60. The power source 68 can include one or more solar panels 91 (see FIG. 6) that produce power when exposed to light. The one or more solar panels 91 can supplement other aspects of the power source 68, or can be the sole means of power. In one design as illustrated in FIG. 6, the one or more solar panels 91 can be located on the first side 22 of the casing 20. This positioning causes the one or more solar panels 91 to be exposed to light when the device 10 is floating in water.

In addition to transmitting an outgoing signal, the control system 60 can also include one or more additional components. The control system 60 can include a GPS component 66 for receiving coordinate information to determine a geographic position of the device 10. The control system 60 can be configured to record and store the GPS location of the device 10. This can include the location at the time the control system 60 is activated, as well as an on-going location of the device 10 after activation.

The control system 60 can include one or more sensors 90 that detect one or more conditions that the device 10 experiences. Sensors 90 can be configured to detect a variety of conditions, including but not limited to a change in velocity, altitude, temperature, and if the device is submersed in water. One or more sensors 90 can be accelerometers 97 that detect rapid deceleration that is consistent to a crash event. The sensors 90 can be positioned within the interior space 21 and/or on an exterior of the casing 20. The control system 60 can also include a clock (not illustrated) to associate the time with the various sensed conditions.

The control system 60 can be activated in various manners. One manner includes a manual switch 69 that is activated by a user. During or after an event, the switch 69 can activate the device 10 and cause power to be supplied to the various powered components of the control system 60. The control system 60 can also be configured to be activated upon the occurrence of a predetermined event. Examples include but are not limited to deceleration beyond a predetermined amount, submersion in water, a drop in elevation, and activation of the harmonic transceiver 40.

The control system 60 can include one or more lights 92. The lights 92 can be positioned on the exterior of the casing 20 and can be illuminated to further aid in the visibility of the device 10. In one design, the light 92 is a strobe light that produces regular flashes of light.

Figure 8:
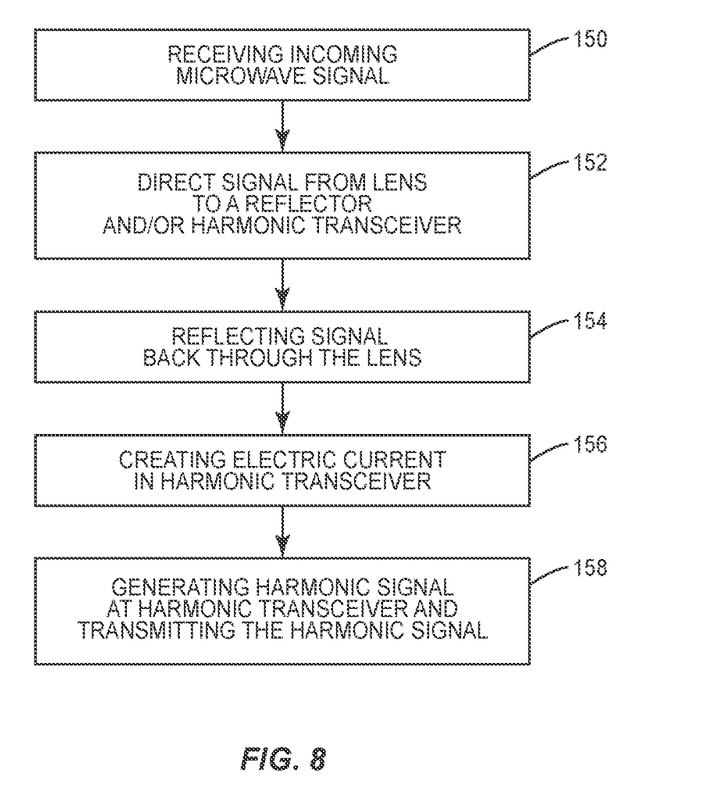
FIG. 8 is a flowchart diagram of a method of a passive signaling device receiving an incoming signal and transmitting an outgoing signal.

FIG. 8 illustrates a method of using the device 10. A remote source, such as a search party or a monitoring facility, can use radar in searching for the device 10. The remote source transmits a microwave signal. The incoming microwave signal reaches the device 10 (block 150). The microwave signal passes through a lens 30 and is directed to a reflector 50 positioned within the interior space 21 of the device 10 (block 152). The signal reflects from the reflector 50 and is directed back through the interior space 21 and through the lens 30 (block 154). This outgoing signal can include a greater signature due to passing through the lens 30. This outgoing signal is a first passive signal that is transmitted from the device 10.

The incoming microwave signal can also be directed to the harmonic transceiver 40. This can include directing the microwave signal from the lens 30 to the harmonic transceiver 40. The reflector 50 can direct the microwave signal to the harmonic transceiver 40. The harmonic transceiver 40 can also receive the microwave signal at an exterior antenna 41. The microwave signal creates an electric current in the harmonic transceiver 40 (block 156). The current causes the harmonic transceiver 40 to emit a harmonic signal that is transmitted outward from the device 10 through the antenna 41 (block 158).

Although not illustrated in FIG. 8, the methodology can also include activation of the control system 60. The activation can occur through various manners, including but not limited to a sensed occurrence (e.g., drop in velocity) or by manual activation of a switch 69 on the device 10. The control system 60 is powered by a power source 68 and transmits an outgoing signal. This signal can be transmitted during the time that the power source 68 is able to supply power to the control system 60.

The device 10 can be used in a variety of contexts. One use is within the aerospace field. The signaling device 10 can be used on unmanned vehicles such as drones for collision avoidance and guarding closed airspace. The signaling device 10 can be used with vehicles to facilitate recording the location of an incident to expedite recovery operations.

When used with vehicles, the devices 10 can be mounted at locations that are of particular interest in case of an incident. Locations on an aircraft include but are not limited to wing to body fairing panels, canoe panels and the dorsal fin. These locations, if disrupted, can facilitate deploying the device 10. The device 10 can also be affixed to escape slides on vehicles to enable better detection and faster rescue if the escape slides are used as life rafts.

The device 10 can be used in the maritime field. The device 10 can be attached or otherwise associated with a life jacket, immersion suit, or life raft for better detection and rescue. The devices 10 can be used with small watercraft such as kayaks, canoes, and paddle boards for better detection by larger vessels. The devices 10 can be used with dive float flags used by SCUBA divers or swim buoys used by open water swimmers for safety from vessels The devices 10 can also be used by people in the outdoors, such as hikers, skiers, climbers who could require rescue in remote areas. The devices 10 could also be worn by emergency personnel, such as firefighters or police officers to enable better command and control by tracking and directing teams or individuals on the field.

Figure 9:
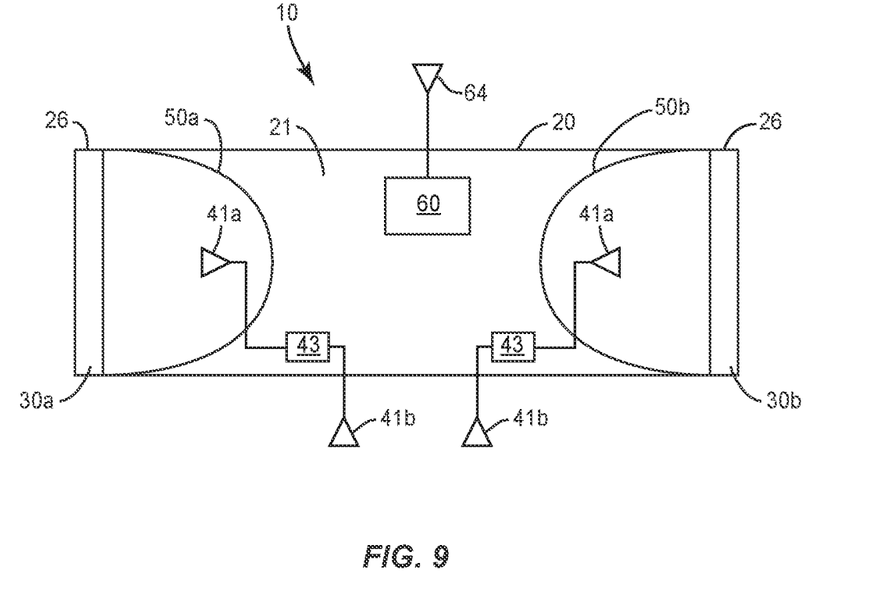
FIG. 9 is a schematic diagram of a passive signaling device.

FIG. 9 illustrates a signaling device 10 that includes opposing mechanisms to receive an incoming signal. The device 10 includes a casing 20 with opposing openings 26 that lead into the interior space 21. A first lens 30a and a first reflector 50a are positioned at a first side of the casing 20. A second lens 30b and a second reflector 50b are positioned at an opposing second side of the casing 20. The lens 30a, 30b can include various configurations, including one or both being a wide angle lens. The lenses 30a, 30b can be configured for the focal point to direct the incoming signal to the corresponding antenna 41a.

The reflectors 50a, 50b can be positioned 180° apart. This orientation provides for an incoming signal to be received and a corresponding outgoing signal to be transmitted regardless of the orientation of the device 10. Other designs can include the reflectors 50a, 50b positioned at different angular orientations relative to each other. In one design, the opposing reflectors 50a, 50b provide for drone detection. In one design, the device 10 is attached to an airborne drone.

The device 10 can also include a control system 60 with an antenna 64 to transmit an outgoing powered signal. One design includes an outgoing signal, such as one being a 406 MHz signal. In one design, the device 10 is sized to be a hand held unit.

Figure 10:
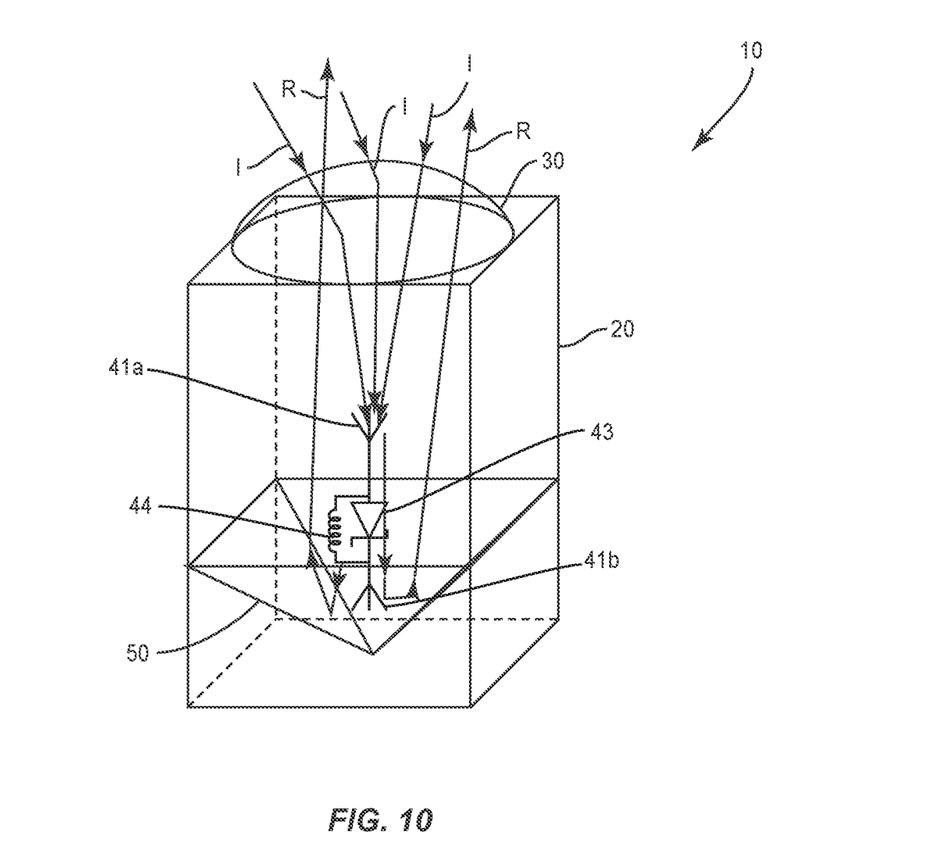
FIG. 10 is a schematic diagram of a passive signaling device.

FIG. 10 illustrates a signaling device 10. The device 10 includes a corner reflector 50 to reflect the incoming signal I outward as a reflected signal R. Other shapes of reflector 50 can also be included in the device 10. The lens 30 further focuses the incoming signal I on the receiving antenna 41a resulting in an outgoing signal being transmitted through the transmitting antenna 41b. In another design, the corner reflector 50 is formed as a resonate cavity. The device 10 can also include a control system 60 to transmit a powered signal (not illustrated).

Figure 11:
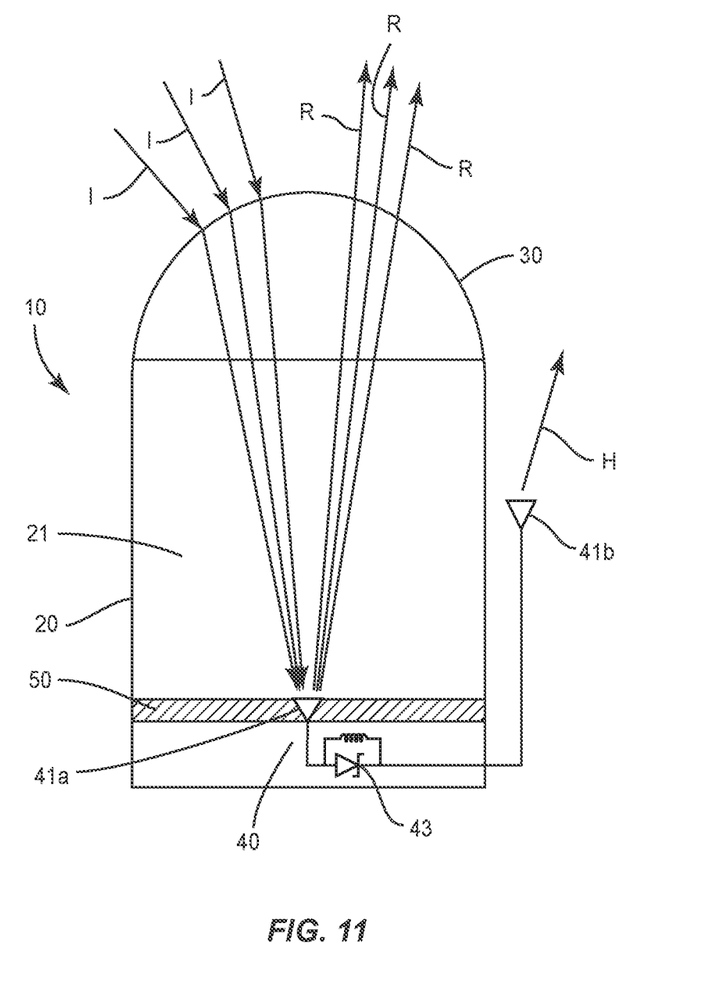
FIG. 11 is a schematic diagram of a passive signaling device.

FIG. 11 includes a signaling device 10 with an integrated antenna 41a. The integrated receiving antenna 41 is positioned at a focal point of the incoming signal. In use, the incoming signal I is focused by the lens 30 onto the reflector 50. The incoming signal I is reflected back as a boosted reflected signal R. The receiving antenna 41a also receives the incoming signal I. The non-linear device 43 receives the signal and multiplies the frequency and sends the signal to the transmitting antenna 41b that emits the outgoing harmonic signal H. Since the reflector 50 and the receiving antenna 41a are both at the focal point, the outgoing reflected signal R and the outgoing harmonic signal H include a higher strength.

In another design (not illustrated), the reflector 50 is the receiving antenna 41a. The reflector 50 can be a flush mount antenna. The non-linear device 43 receives the signal from the reflector 50 and sends a harmonic signal H that is transmitted through the transmitting antenna 41b.

The device 10 can be used on a variety of vehicles. Vehicles include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present disclosure can be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A signaling device comprising: a casing that includes an interior space; a reflector positioned in the interior space that reflects a microwave signal that enters into the interior space; a harmonic transceiver positioned within the interior space of the casing; a lens connected to the casing that focuses the microwave signal that is incoming into the interior space on the reflector and the harmonic transceiver; the reflector reflects the microwave signal back through the lens and away from the casing as a reflected signal; and the harmonic transceiver generates a harmonic signal in response to being exposed to the microwave signal and transmit the harmonic signal away from the casing.

2. The signaling device of claim 1, wherein the harmonic transceiver comprises a first antenna to receive the microwave signal, a non-linear device, and a second antenna to transmit the harmonic signal.

3. The signaling device of claim 1, further comprising a resonant cavity configured to produce the reflected signal to have the same harmonic frequency as the harmonic signal.

4. The signaling device of claim 1, wherein the harmonic transceiver is positioned in the interior space between the lens and the reflector.

5. The signaling device of claim 1, wherein the harmonic transceiver is separate from the reflector and spaced away from the reflector within the interior space.

6. The signaling device of claim 1, wherein the reflector reflects the microwave signal to the harmonic transceiver.

7. The signaling device of claim 1, wherein the casing and the lens extend around and form a weatherproof seal around the interior space.

8. The signaling device of claim 1, wherein the casing comprises a center of gravity within the interior space away from the lens for the lens to be positioned upward when the casing floats in water.

9. The signaling device of claim 1, further comprising a control system comprising:
a control circuit;
a read only memory circuit that stores a unique identifier;
a communication circuit to transmit an outgoing signal; and
a power source to supply power to the control circuit.

10. A vehicle comprising, the signaling device of claim 1.

11. The vehicle of claim 10, wherein the vehicle is an aircraft.

12. A signaling device comprising:
a casing that extends around an interior space;
a lens attached to the casing to focus a microwave signal that is incoming into the casing in the interior space;
a harmonic transceiver in the interior space that generates and outputs a harmonic signal in response to exposure to the microwave signal;
a reflector positioned in the interior space that reflects the microwave signal back through the lens and away from the casing as a reflected signal; and
a powered control system positioned in the interior space that emits a signal outward beyond the casing.

13. The signaling device of claim 12, wherein the harmonic transceiver comprises:
a first antenna to receive the microwave signal;
a non-linear device;
a second antenna to transmit the harmonic signal; and
an inductor that extends between the first antenna and the second antenna.

14. The signaling device of claim 12, wherein the harmonic signal and the reflected signal have a common harmonic frequency.

15. The signaling device of claim 12, wherein the lens is positioned at a top of the casing, the reflector is positioned at a bottom of the casing, and the harmonic transceiver is positioned between the lens and the reflector.

16. A method of using a passive device, the method comprising:
receiving a microwave signal at a lens;
passing the microwave signal through the lens in a first direction and to a harmonic transceiver and to a reflector positioned within an enclosed interior space;

reflecting the microwave signal off the reflector and sending a reflected signal back through the lens in an opposing second direction and away from the interior space;

creating an electrical current in the harmonic transceiver in response to the harmonic transceiver receiving the microwave signal that passes through the lens; and generating a harmonic signal at the harmonic transceiver and transmitting the harmonic signal away from the interior space.

17. The method of claim 16, further comprising directing the reflected signal back through the lens and increasing a strength of the reflected signal.

18. The method of claim 16, further comprising reflecting the microwave signal off the reflector and through the lens and transmitting the harmonic signal from the harmonic transceiver without passing through the lens.

19. The method of claim 16, wherein the harmonic signal and the reflected signal have the same harmonic frequency.

20. The method of claim 16, reflecting the microwave signal off the reflector and to the harmonic transceiver.

\* \* \* \* \*